May 2, 1967 L. H. GARDNER 3,316,930
VALVE
Filed Nov. 4, 1964 2 Sheets-Sheet 1
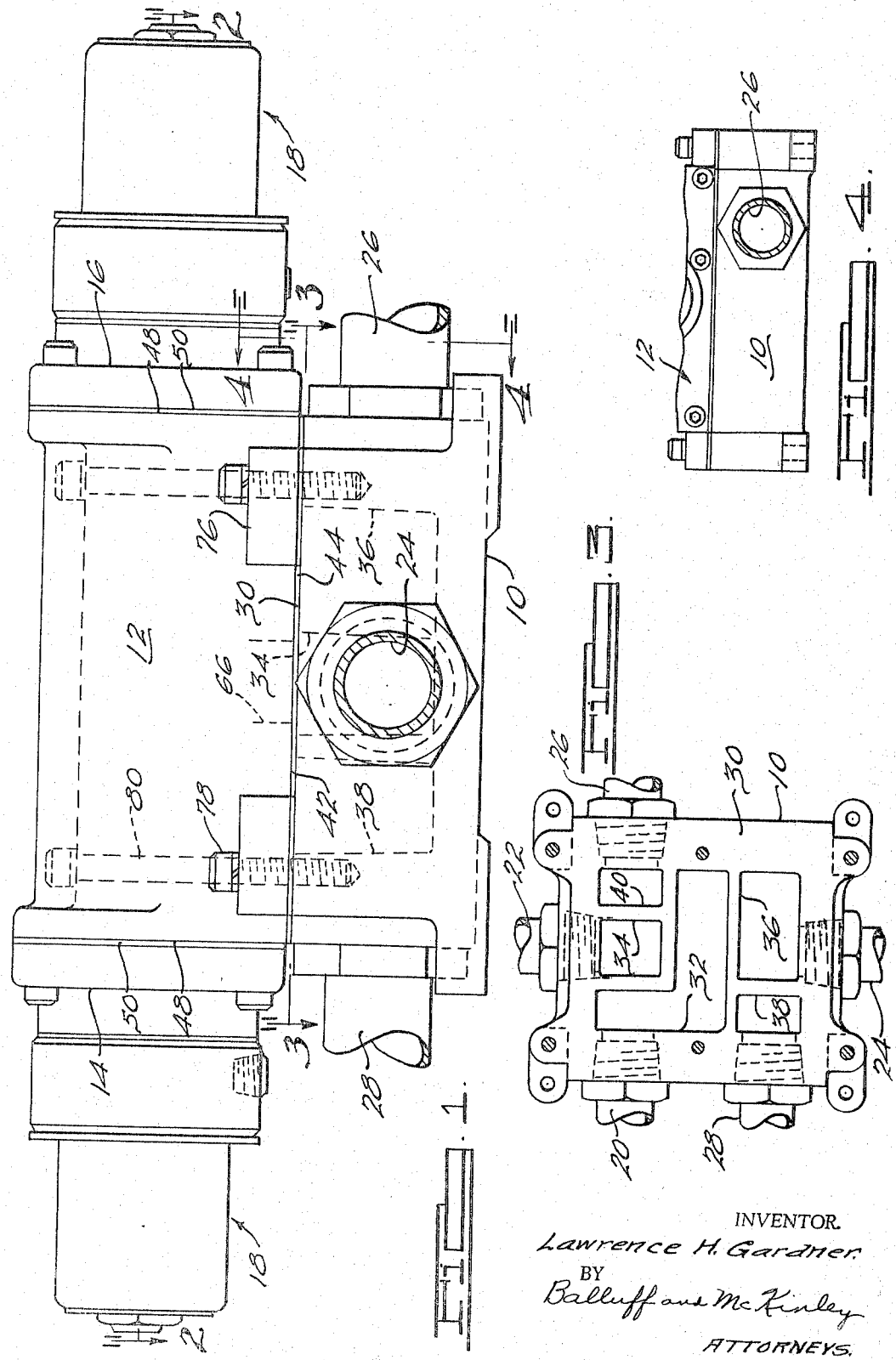
INVENTOR.
Lawrence H. Gardner
BY
Balluff and McKinley
ATTORNEYS.

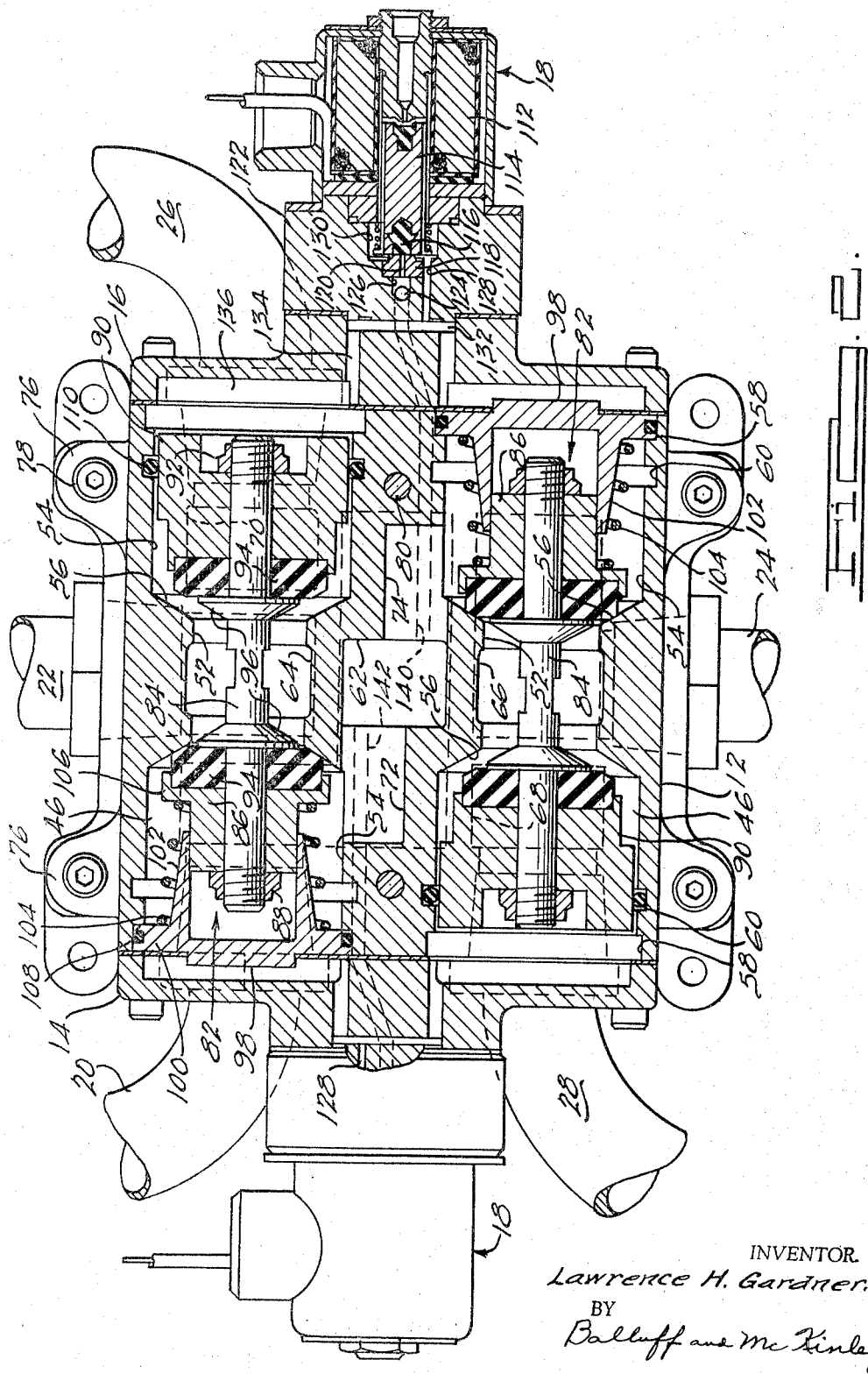

United States Patent Office 3,316,930
Patented May 2, 1967

3,316,930
VALVE
Lawrence H. Gardner, 30247 Lorain Road,
North Olmsted, Ohio 44070
Filed Nov. 4, 1964, Ser. No. 408,864
4 Claims. (Cl. 137—270)

This invention relates to a valve structure of the kind employed for alternately supplying pressure fluid to and exhausting pressure fluid from a work cylinder, and more particularly to a poppet type valve structure wherein the fluid under pressure is selectively supplied to one end of the poppet valve to shift the same against a spring which urges the poppet valve in the opposite direction. The valve is so constructed and arranged that its component parts may be employed interchangeably to provide either a 3-way valve or a 4-way valve, and to this end a novel poppet valve mounting and guiding means is provided to adapt the valve components to a number of different uses.

A principal object of the invention is to provide a new and improved poppet type valve.

A further object of the invention is to provide a valve of the type described having an improved mounting means for the poppet valve which enables the components of the valve to be assembled in a variety of ways to adapt the same for different uses.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIG. 1 is a side elevational view of a valve constructed according to the present invention;

FIG. 2 is a horizontal sectional view taken on line 2—2 of FIG. 1;

FIG. 3 is a sectional view taken on line 3—3 of FIG. 1; and

FIG. 4 is a sectional view taken on line 4—4 of FIG. 1.

In the drawings there is illustrated a 4-way poppet valve which includes a base plate 10, a valve body 12, end plates 14 and 16, and a solenoid valve 18 mounted on each of the end plates 14 and 16.

The base plate 10 comprises a generally rectangular block having a series of threaded ports in its side walls to provide an inlet port 20, a pair of cylinder ports 22 and 24, and exhaust ports 26 and 28. The base plate 10 is provided with recesses opening from its upper surface 30. The recesses or chambers 32, 34, 36, 38 and 40 communicate with the ports 20, 22, 24, 26 and 28 respectively.

The valve body 12 comprises a cast metal block having its lower surface 42 seated on the upper surface 30 of the base plate 10 with a gasket 44 therebetween to provide a fluid-tight seal between the valve body 12 and the base plate 10. The valve body 12 is provided with a pair of parallel bores 46 which extend through the end walls 48 of the valve body 12, and the end plates 14 and 16 are seated against the end walls 48 of the valve body with gaskets 50 disposed therebetween.

The valve bores 46 are identical and are symmetrical about the center line of the work ports 22 and 24. Each of the valve bores includes a reduced diameter portion 52 at its center and a larger diameter portion 54 at each end thereof, with a conical valve seat 56 connecting the portions 52 and 54. The enlarged portions 54 of the bores 46 are provided with grooves 58 at their outer ends and similar grooves 60 spaced a slight distance inwardly from the grooves 58.

The valve body is provided with recesses extending downwardly from the bores 46 to the bottom face 42 of the valve body, the recesses 62, 64, 66, 68 and 70 communicating with the recesses 32, 34, 36, 38 and 40 respectively in the base plate 10. In addition, a passage 72 in the valve body 12 establishes communication between the recess 62 and the enlarged portion 54 of one of the bores 46 while a passage 74 establishes communication between the recess 62 and the opposite end of the other bore 46. The valve body 12 is provided with mounting pads 76, and screws 78 extend through the mounting pads 76 and are threaded into the base 10 for securing the valve body to the base. Additional screws 80 may also be provided for securing the valve body to the base.

Poppet valves 82 of identical construction are mounted in each of the bores 46 and adapted to be reciprocated therein. Each of the poppet valves includes a stem 84 having an inlet valve member 86 secured on one end by means of a nut 88 and an exhaust valve member 90 secured on its other end by a nut 92. A washer 94 made of rubber or other suitable sealing material is seated within a socket in the inner end of each of the valve members 86 and 90 and is retained therein by an enlarged shoulder 96 on the stem 84. The spacing of the valve members 86 and 90 on the valve stem 84 is such that when one of such valve members is engaged with its valve seat 56, the other valve member is unseated with respect to its valve seat 56 as shown in FIG. 2.

A valve guide member 98 is provided for each of the inlet valve members 86 and includes a flange 100 seated within the groove 58 at the end of one of the bores 46 and retained therein by one of the end plates 14 or 16. The valve guide 98 includes a tubular collar 102 within which the valve member 86 is slidably received. A spring 104 confined between the flange 100 on the guide 98 and a flange 106 on the valve member 86 urges the poppet valve 82 in a direction to seat the inlet valve member 86 and unseat the exhaust valve member 90.

An O-ring 108 located within a groove in the flange 100 of the valve guide 98 seals against the bore 46 in the valve body 12 and an O-ring 110 disposed within the groove 60 at the opposite end of the bore seals against the exhaust valve member 90.

The solenoid valves 18 are also identical in construction and each includes a coil 112 and a plunger 114 adapted to be reciprocated when the coil is energized and de-energized and carrying a sealing member 116 in its outer end adapted to sealingly engage a valve seat member 118 having a passage 120 therein. The solenoid further includes a valve body 122 having a radial inlet port 124 intersecting an axial passage 126 which is aligned with the passage 120 in the valve seat member 118. A passage 128 leads from a chamber 130 in the body 122 to a recess 132 in the outer face of the cover plate 14 or 16 to which the solenoid valve is secured. Axially extending passages 134 lead from the recess 132 to the inner side 136 of the cover plate to communicate with the end of the bore 46 which contains the exhaust valve 90, suitable openings being provided in the gasket 50 for such purpose.

The pressure fluid, such as compressed air, from a suitable source (not shown) is delivered through the inlet port 20 in the base plate 10 to the recess 32 therein which communicates with the recess 62 in the valve body 12. Inlet pressure is thus supplied through passages 72 and 74 to the inlet valve chambers containing the valve members 86 which are retained against valve seats 76 by the springs 104 and the pressure fluid. The cylinder port 22 is at such time in communication with the exhaust port 26 through the recesses 34 in the base 10, the recess 64 in the valve body, the right-hand end of the bore 46, and the communicating recesses 70 and 40 in the valve body and base plate respectively. The cylinder port 22 communicates in a similar manner with the exhaust port 28.

The solenoid valves may be selectively or simultaneously energized to shift either or both of the poppet valves 82 against the springs 104. The solenoid valve 118 at the right-hand end of the valve shown in FIG. 2 controls the poppet valve 82 which is associated with the work port 22. A passage 140 communicates at one end with the chamber 62 in the valve body 12 and extends through the valve body, the end plate 16, and the solenoid valve block 122 to communicate with the passage 124 therein. When the solenoid 18 is energized, the plunger 114 will uncover the passage 120 in the valve seat member 118, thereby supplying fluid under pressure from the inlet port 20 through passages 128, 132, and 134 to the outer end of the exhaust valve member 90. The area of the exhaust valve member 90 which is exposed to the pressure fluid is considerably larger than the area of the inlet valve member 86 exposed to the pressure fluid so that upon energization of the solenoid the poppet valve 82 will shift to the left to engage the exhaust valve member 90 with its valve seat 56 while unseating the inlet valve member 86. The pressure fluid will then flow past the inlet valve member 86 to the recess 64 in the valve body and through recess 34 in the base to the work port 22. As soon as the solenoid is de-energized, the spring 104 will return the poppet valve to its normally closed position in which the cylinder port 22 is in communication with the exhaust port 26. The other poppet valve 82 which is associated with the work port 24 is controlled in a similar manner by the solenoid valve 18 at the left-hand end of the valve. A passage 142 establishes communication between the inlet pressure cylinder 62 in the valve body and the left-hand solenoid 18.

By reason of the symmetrical construction of the valve and the construction of the poppet valves, including the valve guides 98, it is possible to obtain a variety of valve constructions simply by interchanging the valve components or reversing one of the poppet valves within its bore. For example, if one of the poppet valves shown in FIG. 2 is reversed or turned end-for-end and the left-hand solenoid valve 18 eliminated, the work port 22 will normally be closed off from the inlet pressure by its inlet valve member 86 while the work port 24 will be in communication with the inlet port 20. Energization of the right-hand solenoid 18 then would shift both poppet valves to the left to communicate port 22 with inlet pressure while communicating the work port 24 with the exhaust port 28. This is made possible by the fact that the opposite ends of each bore 46 are of identical construction so that the valve guide 98 can be seated within either end of the bore.

In addition, the solenoid valve 18 could be eliminated and pilot pressure from any suitable source employed for shifting the poppet valves against their springs 104. The passages 140 and 142 would of course be suitably plugged in such modification.

It will be noted that one of the poppet valves shown in FIG. 2 together with its inlet, work and exhaust ports, constitutes a 3-way valve, and the valve construction disclosed herein may be used in such manner. With such arrangement it would be possible to reverse the poppet valve and its valve guide to provide either a normally open or a normally closed valve without additional valve parts and without any change in any of the valve components. The valve structure of this invention thus provides a very versatile structure which without any additional parts or modification of existing components may be adapted to a wide variety of uses to perform a variety of functions.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:
1. A valve for alternately supplying pressure fluid to and exhausting pressure fluid from a work cylinder, comprising a base member having an inlet port, an exhaust port and a work port therein, a valve body mounted on said base member and having a valve bore extending therethrough, said valve bore having a central portion communicating with said work port and inlet and exhaust chambers at its opposite ends, outwardly facing valve seats at the inner ends of said inlet and exhaust chambers, said inlet chamber communicating with said inlet port and said exhaust chamber communicating with said exhaust port, a poppet valve in said bore and having an inlet valve member at one end thereof disposed in said inlet chamber and engageable with the valve seat therein and an exhaust valve member at its other end disposed in said exhaust chamber and engageable with the valve seat therein, said valve members being spaced apart a distance greater than the spacing of said valve seats whereby when one of said valve members is seated the other is unseated, spring means urging said poppet valve in a direction to engage one of said valve members with its valve seat, passage means communicating with said inlet chamber and the end of said bore containing the other of said valve members for supplying inlet pressure against the outer end of said other valve member, the area of said other valve member exposed to said inlet pressure being greater than the area of said one valve member exposed to said inlet pressure, and pilot valve means in said passage means for selectively permitting flow of pressure fluid against said other valve member to effect reciprocation of said poppet valve, said valve bore being symmetrical on opposite sides of said central portion whereby said poppet valve may be reversed end-for-end within said bore to provide in one position of assembly into said bore a normally open valve and in the reversed position of assembly within said bore a normally closed valve.

2. A valve according to claim 1 including a fixed valve guide in one end of said bore with said one valve member slidably mounted on said valve guide and said other valve member slidably mounted within said bore.

3. A valve for alternately supplying pressure fluid to and exhausting pressure fluid from a pair of work cylinders, comprising a base member having an inlet port, an exhaust port and a pair of work ports therein, a valve body mounted on said base member and having a pair of parallel valve bores extending therethrough, said valve bores each having a central portion communicating with one of said work ports and inlet and exhaust chambers at their opposite ends, outwardly facing valve seats at the inner ends of said inlet and exhaust chambers, said inlet chambers communicating with said inlet port and said exhaust chambers communicating wtih said exhaust port, a poppet valve in each bore and having an inlet valve member at one end thereof disposed in said inlet chamber and engageable with the valve seat therein and an exhaust valve member at its other end disposed in said exhaust chamber and engageable with the valve seat therein, said valve members being spaced apart a distance greater than the spacing of said valve seats whereby when one of said valve members is seated the other is unseated, spring means urging said poppet valves in a direction to engage said one of the valve members of each poppet valve with its valve seat, a passage for supplying inlet pressure against the outer ends of the other of said valve members, the area of each of said other valve members exposed to said inlet pressure being greater than the area of said one valve member exposed to said inlet pressure, and means in said passages for selectively permitting flow of pressure fluid against said other valve members to effect reciprocation of said poppet valves, one of said valve bores being symmetrical on opposite sides of the central portion thereof and the poppet valve in such bore being cooperable therewith so that such poppet valve may be reversed end for end within its bore to provide in one position of assembly in said bore a normally open valve and in the reversed position of assembly in said bore a normally closed valve.

4. A valve according to claim 3 including a fixed valve guide at one end of each of said bores, said one valve member of each poppet valve being slidably mounted on one of said valve guides and the other valve member of each poppet valve being slidably mounted within its valve bore, one of said valve guides being adapted to be mounted at either end of its bore.

References Cited by the Examiner
UNITED STATES PATENTS

| | | | |
|---|---|---|---|
| 2,630,828 | 3/1953 | Bent | 137—625.6 X |
| 2,878,832 | 3/1959 | Hoge | 137—596.16 |
| 2,940,475 | 6/1960 | Hicks | 137—596.16 |
| 3,232,316 | 2/1966 | Carlisle | 137—596.16 |

M. CARY NELSON, *Primary Examiner.*

HENRY T. KLINKSIEK, *Examiner.*